United States Patent [19]

Tsuyama et al.

[11] 4,436,239
[45] Mar. 13, 1984

[54] METHOD AND APPARATUS FOR MANUFACTURING SPIRAL PIPE

[75] Inventors: Yoshito Tsuyama, Kitakyushu; Yasumi Shimazaki, Munakata; Kazutoshi Kakita, Kitakyushu; Toshio Hirokawa, Kimitsu, all of Japan

[73] Assignee: Nippon Steel Corporation, Tokyo, Japan

[21] Appl. No.: 258,555

[22] Filed: Apr. 29, 1981

[51] Int. Cl.³ .............................................. B23K 31/06
[52] U.S. Cl. ..................................... 228/17; 228/17.7; 228/145; 72/11; 72/16; 72/49
[58] Field of Search ......................... 228/17, 17.7, 145; 219/62; 72/11, 12, 16, 49

[56] References Cited

U.S. PATENT DOCUMENTS

| | | | |
|---|---|---|---|
| 367,494 | 8/1887 | Alden | 228/145 |
| 3,845,645 | 11/1974 | Gebauer | 228/17 X |
| 3,905,536 | 9/1975 | Claussen | 228/17 |
| 3,955,389 | 5/1976 | Foster | 72/702 X |

FOREIGN PATENT DOCUMENTS

| | | | |
|---|---|---|---|
| 2509329 | 9/1976 | Fed. Rep. of Germany | 72/49 |
| 53-12757 | 2/1978 | Japan . | |
| 55-130333 | 10/1980 | Japan . | |
| 2027373 | 2/1980 | United Kingdom | 72/49 |

*Primary Examiner*—Kenneth J. Ramsey
*Attorney, Agent, or Firm*—Wenderoth, Lind & Ponack

[57] ABSTRACT

In the manufacturing of a spiral pipe, there is first determined a maximum curvature which should be imparted to a strip of pipe forming material in order that a desired residual moment will be imparted to the finished pipe after the strip bent to the maximum curvature is allowed to spring back from the bent condition, which maximum curvature is determined based on the thickness, Young's modulus and yield stress of the strip, the desired curvature of the finished pipe, and the residual moment to be imparted to the finished pipe. By adjusting the position of three rows of forming rolls positioned at the apexes of a triangle, the flat strip is continuously bent into a spiral that has the thus determined maximum curvature. Then, the spirally formed strip is allowed to spring back toward its unbent shape to the diameter of the finished pipe, being stopped in the expansion due to the springback if it reaches the finished pipe diameter before completing springback or being expanded if it completes springback before it reaches the finished pipe diameter. Finally, the seam of the formed strip is welded when the strip is at the desired diameter of the finished pipe.

11 Claims, 19 Drawing Figures

METHOD AND APPARATUS FOR MANUFACTURING SPIRAL PIPE

BACKGROUND OF THE INVENTION

This invention relates to a method and apparatus for manufacturing spiral pipe wherein a strip of pipe forming material is bent into a helical form and the abutting edges of the bent strip are welded together.

Methods of manufacturing spiral pipe fall into three general categories: (1) methods using external holding, (2) methods using internal holding, and (3) methods that use no holding.

In the external holding method, the strip is helically bent into a round form using three sets of forming rolls arranged triangularly. While the springback of the spirally formed strip is prevented by means of a multitude of stationary external holding rolls exerting pressure from outside the pipe, the abutting edges of the strip are welded together. Thus, welding is accomplished while the unwelded bent strip is in contact with the holding rolls. Consequently, the pipe is not welded while it is completely free of load. This is, the seam is formed without relieving the elastic strain within the material of the pipe. Accordingly, when a longitudinal slit is cut in the pipe, the pipe springs back in a direction tending to open the pipe because of residual moment (hereinafter called the ring-opening; the residual moment being defined as positive). The internal holding method bends strip using similar forming rolls, and then welds together the abutting edges while exerting a force which tends to slightly expand the bent strip by means of a multitude of stationary internal holding rolls. In this case, a longitudinal cut made in the pipe causes the pipe to spring back so that the edges of the slit overlap because of residual moment (hereinafter called the ring-opening or the ring-closing; the residual moment being defined as negative). The method using no holding roll bends the strip so that the bent strip possesses the desired outside diameter after allowing for full springback, both inward and outward. With residual moment thus eliminated, the welded pipe does not spring back even if a longitudinal slit is cut therein.

As will be understood, a given amount of springback in a given direction develops in spiral pipe manufactured by most of the conventional methods, despite the intentions of the manufacturer. Therefore, no one has heretofore thought to provide residual moment in the pipe intentionally. As the use of spiral pipe becomes more widespread, however, the inventors have noticed that ignoring this residual moment is responsible for several defects, or impairment of several advantages, of the spiral pipe. For example, a positive residual moment in spiral pipe used to conduct so-called sour gas accelerates the development of stress corrosion cracks. It is therefore desirable to provide offsetting negative residual moment. The spiral pipe manufactured by the external holding method has much residual stress that develops a positive residual moment. When this type of pipe is used for a pipe line, the pressure of the liquid carried therein expands the pipe so as to lower the strength thereof. If a sheet pile is attached to spiral pipe which has negative residual moment or which has no residual moment at all, the cross-sectional shape of the pipe tends to become warped. If a suitable moment of positive residual moment exists, the same pipe will maintain its original round cross-section. It is thus necessary, depending on the use; to control the residual moment (internal elastic strain) that causes springback so that it is within a suitable range. Despite this necessity, the conventional manufacturing methods and apparatus only serve the purpose of making spiral pipe having desired diameters, and do not include means to control residual moment.

Being stationary, the conventional forming apparatus cannot freely control the amount or extent of bending. Therefore, it is difficult not only to provide positive and negative residual moment as desired but also to control the amount of either type of residual moment by means of a single manufacturing method and apparatus. Therefore, to make spiral pipe with positive and negative residual moment as desired requires at least two different types of manufacturing equipment, i.e. which respectively operate on the external and internal holding principles. Providing two different lines in a limited plant space, however, lowers equipment utilization rate, entailing an increase in capital investment and production cost and a considerable economic disadvantage.

SUMMARY OF THE INVENTION:

An object of this invention is to provide a method and apparatus for manufacturing spiral pipe that is capable of freely controlling the amount and direction of residual moment imparted to the pipe.

Another object of the invention is to provide a method and apparatus for manufacturing spiral pipe that is capable of imparting either positive, zero or negative residual moment at will by using a single forming apparatus.

Still another object of this invention is to provide a method and apparatus for manufacturing spiral pipe that is capable of manufacturing the pipe with the desired residual moment by automatically altering the forming conditions in accordance with a change in the thickness and yield stress of the strip of pipe material.

In manufacturing spiral pipe according to the method of this invention, the maximum curvature to which the strip of material should preliminarily be bent in order to develop the desired residual moment is first determined based on the thickness, modulus of longitudinal elasticity(Young's modulus) and yield stress of the strip, the curvature of the pipe to be produced, and the residual moment to be imparted to the pipe. This predetermined curvature is greater, i.e. a smaller radius of curvature, than the curvature of the finished pipe. The flat strip is passed through three rows of forming rolls disposed at the apexes of a triangle, the relative position of the individual rolls being adjusted as required with respect to each other, so that the strip is continuously bent into a spiral form having said maximum curvature. Next, the spirally formed strip is allowed to spring back to or is expanded to the diameter of the finished pipe. Then, the abutting edges of the thus formed strip are welded together.

According to the method of this invention, as described above, the strip is first bent to a curvature having a radius smaller than that specified for the finished pipe, and then the smaller radius is increased to the final radius. This permits imparting a desired amount and direction of residual moment to the pipe by means of a single pipe manufacturing apparatus.

Furthermore, the ratio of the change in the forming load to the change in the yield stress or the amount of bending is detected while the strip is being bent into spiral form. Using this information, the relative positions of the forming rolls are adjusted when there is a change in the yield stress or thickness of the strip. This enables imparting the desired residual moment to the finished pipe with great precision.

The pipe manufacturing apparatus of this invention has bending moment imparting rolls disposed adjacent to the exit end of the three rows of forming rolls. These bending moment imparting rolls keep the curvature of the spirally bent strip the same as that specified for the finished pipe by restraining the springback of, or expanding, the spirally formed strip.

DETAILED DESCRIPTION OF THE PREFERRED EMBODIMENTS

To control the amount of bending of a strip of pipe forming material in a forming apparatus and bending moment imparting rolls, it is necessary to know the extent of the effect which a change in the yield stress of the strip being formed has on the finished pipe. This information can be obtained from the theory of bending described hereinafter and an inspection prior to manufacture. This inspection determines the relationship of the residual moment, yield stress and amount (or reading) of screwdown(or screw-up, the same holds throughout this specification)on the gauge of the forming apparatus with the amount of actual screwdown and curvature. The results of the inspection are presented in the form of a graph or table. Then the relevant properties of the strip change, the screwdown given to the forming apparatus is adjusted by the use of the graph or table, so that the manufactured pipe always possesses the desired residual moment.

The following paragraphs describe the process of forming a spiral pipe based on a fundamental theory of bending and the control of the diameter and residual moment of the finished pipe based on the results of the study.

First, the ring-opening or-closing which has a direct relationship to residual moment will be explained.

Figure 1A:
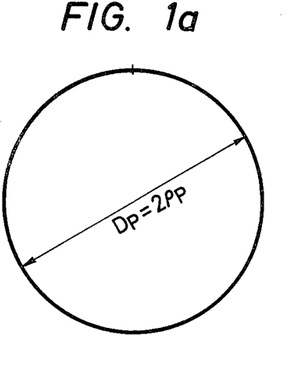
FIGS. 1a and 1b schematically illustrate ring-opening ratio, FIG. 1a showing the finished pipe before slit-cutting and FIG. 1b showing the one after slit-cutting.
Figure 1B:
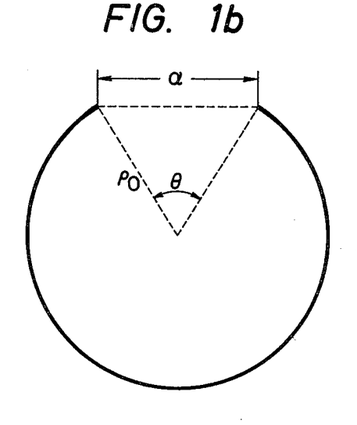

The ring-opening ratio as shown in FIG. 1 has the following geometric relations: $\alpha = 2\rho_o \sin \theta/2$ and $2\pi\rho_p = (2\pi - \theta)\rho_o$, where $\rho_p$ is the radius of curvature of the finished pipe, and $\rho_o$ is the radius of curvature of the formed pipe with the ring-opening ratio that has been allowed to spring back to the fullest extent.

If the ring-opening rato $\gamma$ is defined as $\gamma = \alpha/D_p$, $\gamma$ is expressed as follows, from the above two equations:

$$\gamma = \frac{\rho_o}{\rho_p} \sin \frac{\rho_o}{\rho_p} \pi = \frac{\sin\omega\pi}{\omega} \qquad (1)$$

$$\text{where } \omega = \frac{\rho_p}{\rho_o}$$

Figure 2:
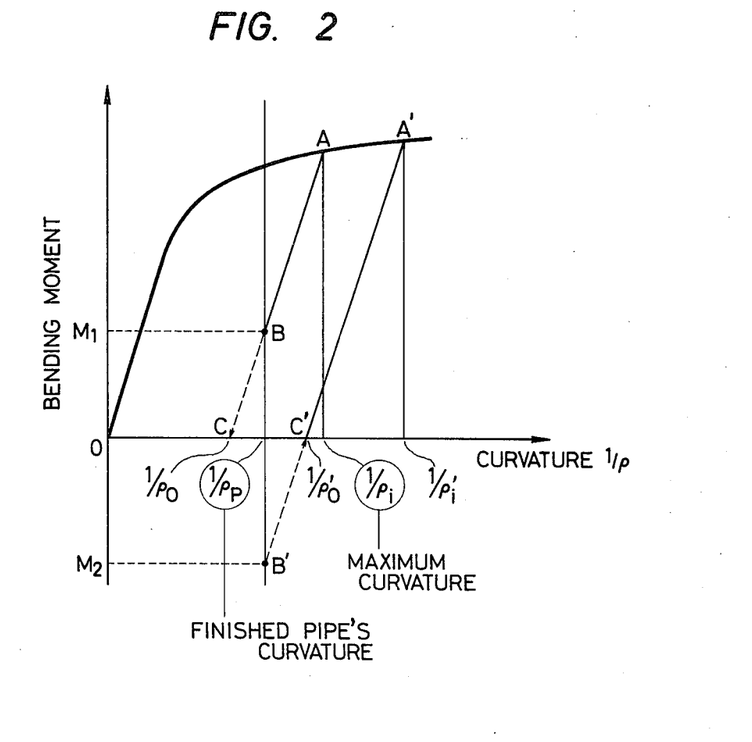
FIG. 2 is a graph showing the relationship of the curvatures of the pipe midway in the bending and in the finished pipe relative to the bending moment.

The following describes the change in curvature caused by the occurrence of the ring-opening ratio based on the relationship between beinding moment and curvature. As shown in FIG. 2, for forming a pipe with a curvature $1/\rho_p$ and with a positive residual moment, the strip of material is first bent to point A where the maximum curvature is $1/\rho_i$. Then the edges of the formed strip are welded together into finished pipe form at point B midway through springback toward an unstressed bent form, the finished pipe having a curvature $1/\rho_p$ and a positive residual moment $M_1$. If a longitudinal slit is cut in this pipe, the slit develops into a gap, releasing the residual moment. The pipe thus cut open has a curvature $1/\rho_o$, indicated at point C(ring-opening). For a pipe with curvature $1/\rho_p$ with a negative residual moment the strip is bent to point A' where the maximum curvature is made greater to make possible imparting negative residual moment $M_2$. In this case, as seen in FIG. 2, at a zero residual moment, i.e. when springback is completed to the unstressed condition, the radius of curvature $1/\rho_o$ of the slitted pipe is smaller than that of the finished pipe, and the pipe must be expanded to the desired diameter to have a curvature $1/\rho_p$. At this diameter it is welded. Then if it is cut, the edges of the pipe along the cut will overlap. Therefore α in FIG. 1 becomes negative and, thus γ too becomes negative (ring-closing). To obtain the finished pipe curvature B' and C', it is therefore necessary to bend the formed stirp outwardly from inside. It will be seen that in both cases the strip of material is first bent to a curvature which is greater, i.e. with a smaller radius of curvature, than that of the finished pipe, because, as is evident from FIG. 2, the stress curve at the time of release of the bent strip slopes downwardly to the left, in the case of the bending for a positive residual moment intersecting the zero stress base line to the left of the desired pipe diameter and in the case of the bending for a negative residual moment, intersecting to the right of the desired pipe diameter. Of course if the maximum curvature is such that the line intersects the base line at the desired pipe diameter, there is a zero residual moment.

The value ω usually falls in the vicinity of 1. Therefore, γ can be expressed as follows by approximation.

$$\gamma = \frac{\sin\omega\pi}{\omega} \approx \frac{\pi(1-\omega)}{\omega} \quad (2)$$

Assuming that the strip of pipe forming material is a perfectly elastic-plastic material, the stress-strain relation of the strip is expressed as follows based on the foundamental theory of bending.

$$\frac{1}{\rho_o} = \frac{1}{\rho_i}\left[1 - \frac{3}{2}\left(\frac{\sigma_y \cdot \rho_i}{E \cdot t}\right) + \frac{1}{2}\left(\frac{\sigma_y \cdot \rho_i}{E \cdot t}\right)^3\right] \quad (3)$$

Where E, $\sigma_y$ and 2t are Young's modulus, yield stress and thickness of the material strip, respectively.

In ordinary forming, the third term of the part of equation (3) in brackets is negligible. Therefore, $$\omega = \frac{\rho_p}{\rho_o} \approx \frac{\rho_p}{\rho_o}\left(1 - \frac{2}{3}\frac{\sigma_y \cdot \rho_i}{E \cdot t}\right) \quad (4)$$

When the Young's modulus and yield stress (E and $\sigma_y$) of the material of the strip, the pipe dimensions (2t and $\rho_p$) and maximum bending curvature $1/\rho_i$ are determined from equations (2) and (4), the ring-opening ratio γ is also determined.

When the residual moment is positive or zero, $$\gamma > 0, (\omega \leq 1), \text{ then } \rho_o \geq \rho_p \geq \rho_i$$

When the residual moment is negative, $$\gamma < 0, (\omega > 1), \text{ then } \rho_p > \rho_o > \rho_i$$

If the residual stress at the outermost surface of the finished pipe is $\sigma_R$, the ring-opening ratio is expressed as follows based on the fundamental theory of bending:

$$\gamma = \frac{\pi\epsilon}{1-\epsilon}, \epsilon \equiv \frac{\sigma_y \cdot \rho_p}{E \cdot t}\left(\frac{1}{2} + \frac{\sigma_R}{\sigma_y}\right) \quad (5)$$

Furthermore, the bending moment M per unit length of pipe at a maximum curvature of $1/\rho_i$ and the residual moment $M_p$ per unit length of pipe are expressed as follows:

$$M = \sigma_y t^2\left[1 - \frac{1}{3}\left(\frac{\sigma_y \rho_i}{E \cdot t}\right)^2\right] \quad (6)$$

$$M_p = \sigma_y t^2\left[1 - \frac{1}{3}\left(\frac{\sigma_y \rho_i}{E \cdot t}\right)^2\right] - \quad (7)$$

$$\frac{2}{3}E \cdot t^3\left(\frac{1}{\rho_i} - \frac{1}{\rho_p}\right) \text{ or}$$

$$M_p = \frac{2}{3}E \cdot t^3\left(\frac{1}{\rho_p} - \frac{1}{\rho_o}\right) = \frac{2E \cdot t^3}{3\rho_p}\left(\frac{\gamma}{\pi+\gamma}\right)$$

As is evident from the above-described theory of bending, the strip of material is first bent on the forming apparatus to a radius of curvature $\rho_i$ that is smaller than the radius $\rho_p$ specified for the finished pipe. When this formed strip has fully sprung back to reduce the residual moment to zero, the formed strip has a radius of curvature $\rho_o$. The amount and direction of the residual moment in the finished pipe depends upon how much the radius of curvature $\rho_o$ is larger or smaller than the radius $\rho_p$ of the finished pipe. The formed strip is then welded into the final pipe form while being externally or internally held by bending moment imparting or holding rolls that move in the direction of the diameter of the pipe being manufactured, thereby adjusting the radius of curvature $\rho_i$ to the radius $\rho_p$ of the finished pipe. This permits not only controlling the amount of residual bending moment but also providing positive and negative residual moment at will.

It is therefore possible, by the present invention, to provide negative residual moment in the finished pipe, which has so far been impossible when using the external holding method, by first bending the strip to a greater extent that the final product should be and then holding the formed strip from the inside using bending moment imparting rolls. To provide a negative residual moment $M_2$ on the moment-curvature curve in FIG. 2, for example, the bending apparatus bends strip to point A' so that the negative moment $M_2$ is obtained at curvature $1/\rho_p$ that is specified for the finished pipe. Then, the formed strip is welded into the finished pipe form while the bending moment imparting rolls are pressing the formed strip back to the size of the finished pipe or reducing the curvature to that at point B'. By controlling the amount of bending by the forming apparatus so that the maximum curvature can be varied between A and A', the amount of residual moment in the finished pipe can be adjusted within the range $M_1$ and $M_2$, including a zero residual moment.

On the other hand, a positive residual moment can be provided in the finished pipe by holding the formed strip against springing back by the use of external stationary holding rolls, particularly by rolls provided immediately after the forming apparatus.

The internal holding method has thus far been unable to provide a finished pipe having a positive residual moment. But it is now possible to do this by first bending the material of the strip to a smaller maximum curvature and then holding the formed strip from outside using the bending moment imparting rolls. To provide a positive residual moment $M_1$ in the moment-curvature curve in FIG. 2, the forming apparatus bends the strip to point A so that the positive moment $M_1$ is obtained at curvature $1/\rho_p$ that is specified for the finished pipe. Then, the formed strip is welded into the finished pipe form while the bending moment imparting rolls are pressing the formed strip toward the size of the finished pipe, i.e. reducing the curvature to that at point B. Meanwhile, a negative residual moment can be provided by holding the formed strip by use of internal stationary holding rolls, particularly those disposed immediately after the forming apparatus. Thus, the method of this invention permits imparting a freely controlled amount of either positive or negative residual moment to the finished pipe by use of a single forming apparatus. The method obviously can be used to provide zero residual moment.

The invention will now be described in greater detail by reference to the embodiments thereof illustrated in the the accompanying drawings.

Figure 3:
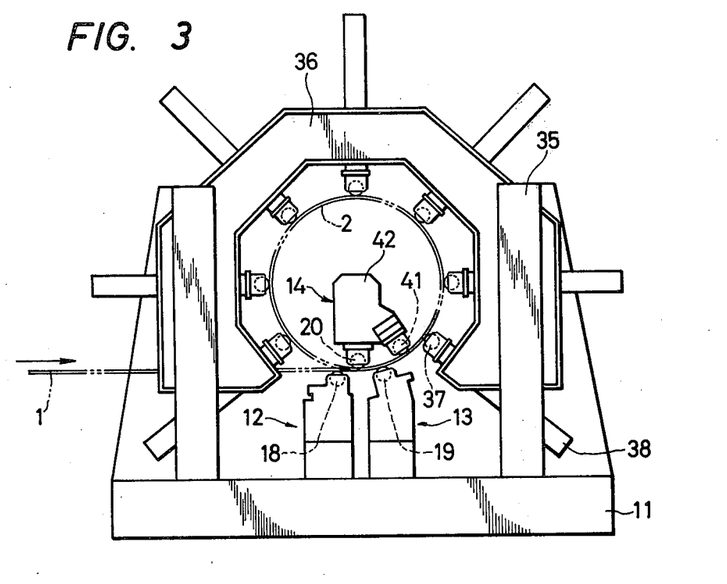
FIG. 3 is an end elevation of a pipe forming apparatus according to one embodiment of this invention used with pipe manufacturing equipment of the external holding type.
Figure 4:
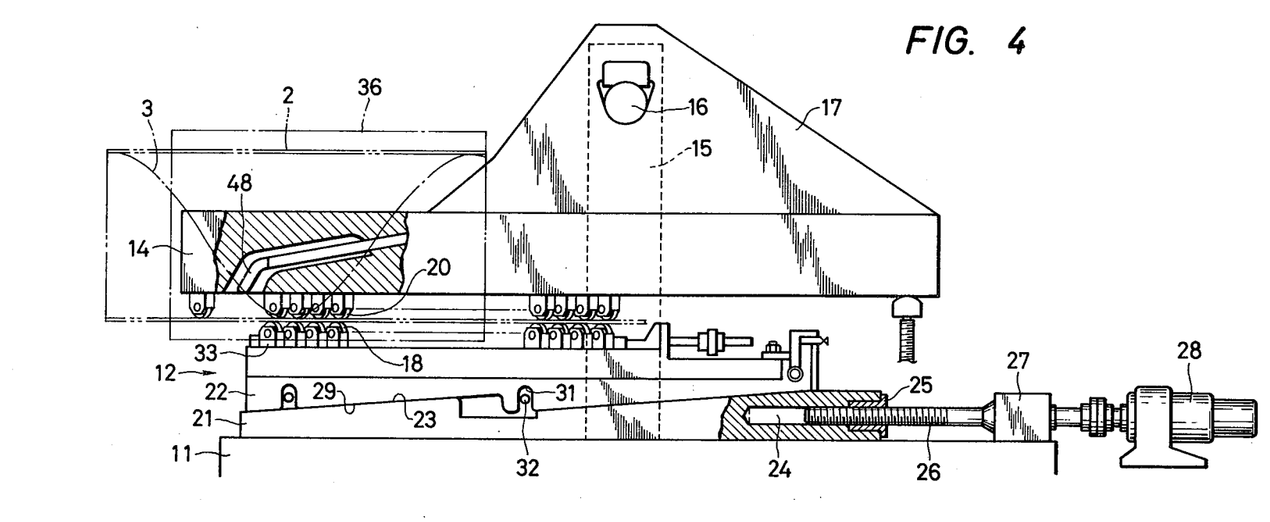
FIG. 4 is a side elevation of the apparatus shown in FIG. 3.
Figure 5:
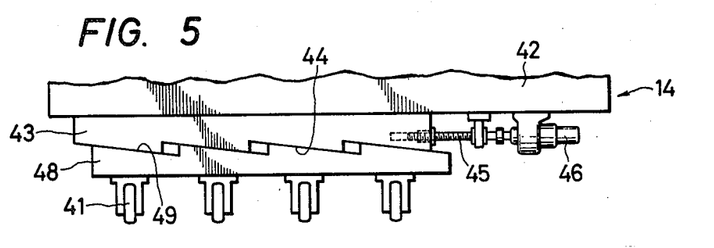
FIG. 5 is a side elevation showing the structure of a stand that supports bending moment imparting rolls in the structure of FIG. 4.

FIGS. 3 and 4 show a pipe manufacturing apparatus of the external holding type to which this invention is applied. As shown, an entry-side external forming stand 12 and an exit-side external forming stand 13 rest on a base 11. An internal forming stand 14 is suspended from a frame 15 on the base stand 11 by a support plate 17 on a pin 16. The internal forming stand 14 is positioned opposite to the entry- and exit-side external forming stands 12 and 13.

The entry- and exit-side external forming stands 12 and 13 and the internal forming stand 14 respectively have rotatable forming rolls 18, 19 and 20 thereon. FIG. 4 shows the arrangement of the entry-side forming rolls 18. As can be seen, a plurality of entry-side forming rolls 18 are disposed along the length of the pipe to be manufactured, with the axes of the rolls being skew with respect to the axis of the pipe at the same angle as the lead angle of the pipe spiral. The exit-side external and internal forming rolls 19 and 20 are also arranged in the same manner as the entry-side forming rolls 18. When viewed from the end of the apparatus, these forming rolls 18, 19 and 20 are disposed at the apexes of a triangle.

As shown in FIG. 4, the entry-side forming stand 12 comprises a moving table 21 that is placed on the base stand 11 so as to be movable in the direction of the axis of the pipe and a roll support table 22 that is placed on the moving table 21 so as to be movable up and down. The moving table 21 has a saw-tooth-shaped inclined surface 23 that is inclined in the direction of the axis of the pipe. An axial opening 24, extending in the direction of the axis of the pipe, is provided in the rear end of the moving table 21, and a threaded sleeve 25 is fitted in the rear part of the axial opening 24. In the threaded sleeve 25 is fitted a threaded rod 26 that is rotatably supported in a bearing 27. As the threaded rod 26, which is connected to a motor 28 through a reduction gear, rotates, the moving table 21 moves back and forth. The roll support table 22 has an inclined surface 29 similar to that on the moving table 21 slidably engaged with surface 23. The roll support table 22 is placed on the moving table 21 so that the surfaces 23 and 29 are held in contact with each other. A groove 31 is cut in the front end of the inclined surface 29 of the roll support table 22. A pin 32, which is fastened to the frame (not shown) of the base stand 11, fits in the groove 31. When the moving table 21 moves back and forth, accordingly, the pin 32 prevents the roll support table 22 from moving back and forth. Consequently, the roll support table 22 moves up and down instead. On the top of the roll support table 22 is a block 33 on which are rotatably supported the entry-side forming rolls 18.

The exit-side forming stand 13 has the same structure as the entry-side forming stand 12 just described. The vertical position of the forming rolls 18 and 19 is adjusted by moving the moving tables 21 back and forth. When a vertical forming load acts on the moving table 21 during the forming operation, the moving table 21 does not move back and forth because of the friction between the inclined surfaces and because of the threaded sleeve, so that the roll support table 22 does not move up and down at all. Accordingly, the entry-side forming roll 18 is held in the pre-set position. The same is the case with the forming roll 19.

As shown in FIG. 3, pillars 35 stand on the base stand 11 and support a forming case 36 that is C-shaped in cross-section and extends in the direction of the axis of the pipe. The forming case 36 encloses a pipe 2 being manufactured so as to cover an area extending between the point where forming of the pipe 2 begins and the point where welding is performed. The forming case 36 carries a plurality of rotatable external holding rolls 37, which are disposed along the periphery of the pipe 2, by means of support members 38 each including a screw mechanism. The screw mechanism of the support members 38 moves the external holding rolls 37 in and out in the direction of the radius of the pipe to adjust the holding positions thereof. The external holding rolls 37 come in contact with the periphery of the pipe 2, and rotate during the spiral motion of the pipe.

A plurality of bending moment imparting rolls 41 are attached to the internal forming stand 14 and are disposed along the axis of the pipe. As shown in FIG. 3, the bending moment imparting rolls 41 are positioned between the exit-side forming rolls 19 and the external holding rolls 37, i.e. on the exit side in the direction of the circumference of the pipe. It is preferable that the bending moment imparting rolls 41 be positioned as close to the exit-side forming rolls 19 as the apparatus design permits. The bending moment imparting rolls 41 are attached to the internal forming stand 14 in the same manner as the entry-and exit-side forming rolls. That is, a base 42 on the internal forming stand supports a moving table 43 that has a saw-tooth-shaped inclined surface 44. A threaded rod 45 rotatingly driven by a motor 46 through a reduction gear moves the moving table 43 back and forth in the direction of the axis of the pipe. A roll support table 48 also has a saw-tooth-shaped inclined surface 49. The base 42 supports the roll support table 48 so that the inclined surface 49 thereof contacts the sliding surface 44 of the moving table 43. As in the case of the entry-side forming stand 12 described above, the roll support table 48 moves up and down as the moving table 43 moves back and forth.

A welding torch 48 projects from near the front end (i.e. from near the left end in FIG. 4) of the internal forming stand 14. The foremost end of the welding torch 48 is directed toward a seam 3 on the inside of the pipe 2. Although not shown, a welding torch to weld the seam on the outside of the pipe is provided near the welding torch 48.

The following paragraphs describe the method of manufacturing spiral pipe having the desired residual moment by use of the above-described pipe manufacturing apparatus.

To being with, all rolls are set in predetermined positions. That is, the internal forming rolls 20 are positioned so as to hold the internal surface of the pipe 2 so that the pipe 2 attains the maximum curvature $1/\rho_i$ at the position of the internal forming roll 20. The external entry- and exit-side forming rolls 18 and 19 are positioned so as to hold the external surface of the pipe 2 so that the pipe 2 attains a curvature substantially identical with that ($1/\rho_p$) of the finished pipe at the position of the external forming roll 19. The external holding rolls 37 or the bending moment imparting rolls 41 are so positioned as to come in contact with the external or internal surfaces of the pipe 2, respectively, which has been formed by the forming rolls 18, 19 and 20 to attain the final curvature $1/\rho_p$.

A flat strip is horizontally and continuously fed, as shown in FIG. 3, into the pipe manufacturing apparatus the rolls of which are all set in positions as described above. The strip 1 is increasingly bent between the entry-side forming roll 18 and the internal forming roll 20, substantially attaining the maximum curvature $1/\rho_i$ at the internal forming roll 20. Because of springback the curvature of the strip 1 gradually decreases between the internal forming roll 20 and the exit-side forming roll 19, substantially attaining the final curvature $1/\rho_p$ at the exit-side forming roll 19.

While the final curvature $1/\rho_p$ is maintained by the action of the bending moment imparting roll 41 and the external holding roll 37, the seam 3 of the spirally formed strip is welded by the welding torch 48.

Figure 6:
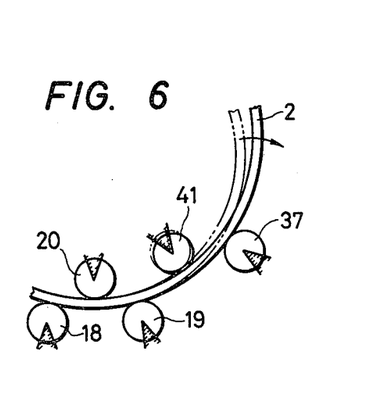
FIGS. 6 and 7 are schematic views illustrating how the bending operation is performed according to the external holding method.

The way in which negative residual moment is imparted to the finished pipe according to the pipe manufacturing method described above will now be described. As shown in FIG. 6, the forming rolls 18 and 19 are adjusted so that the strip is bent to such a curvature that it develops the desired negative residual moment. The strip thus bent as indicated by a dotted line is then pushed back from inside to the desired pipe diameter, as indicated by the solid lines, using the bending moment imparting roll 41. That is, the strip pre-formed to the curvature $1/\rho_i'$ at point A' in FIG. 2 on the forming apparatus is pushed out from inside (c'→B'), using the bending moment imparting roll 41, until the desired finished pipe diameter is established. Then, with the strip in this state, the seam of the strip is welded to complete the manufacture of the spiral pipe. As a consequence, the finished spiral pipe has a negative residual moment $M_2$.

Figure 7:
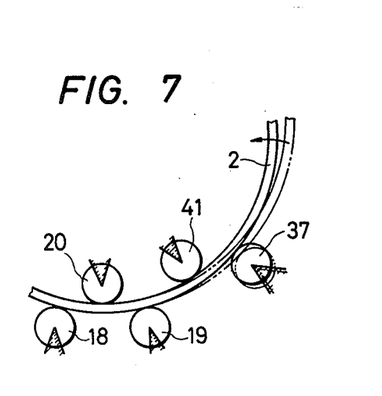

On the other hand, positive residual moment is imparted as follows: the strip is first bent as indicated by the dotted lines in FIG. 7, by the use of the forming apparatus, and then pressed inwardly or back by the external holding roll 37 to the desired finished pipe diameter, as indicated by the solid lines. That is, the strip pre-formed at point A in FIG. 2, to such an extent that the strip expands to point C upon springback, is held at point B by the external holding roll 37. In this state, the seam of the strip is welded, leaving a positive residual moment $M_1$ in the pipe. Therefore, it is possible to impart a desired amount and direction of residual moment within the range of B to B' by setting the maximum bending curvature to that at a point between A and A'.

Obviously the strip can be first bent to a point between A and A' so that on springback it expands precisely to the diameter of the finished pipe, at which time it is welded.

Figure 8:
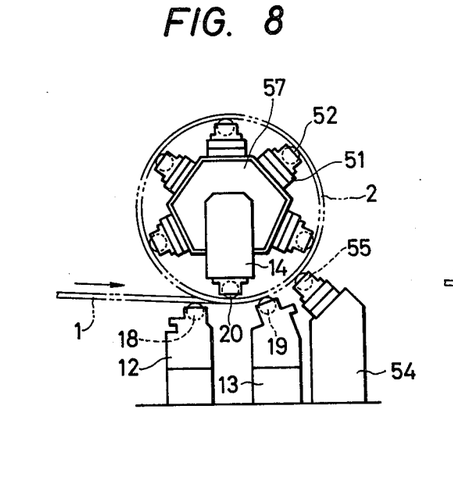
FIG. 8 is an end elevation of a forming apparatus according to an embodiment of this invention used with pipe manufacturing equipment of the internal holding type.

FIG. 8 is an end view of an embodiment of an internal holding type pipe manufacturing apparatus according to this invention. Parts similar to those in the apparatus shown in FIGS. 3 and 4 are designated by similar reference numerals, and will not be described again.

A forming apparatus, or a so-called three roll bender, which comprises external forming rolls 18 and 19 and an internal forming roll 20, bends a strip into a spiral pipe 2. In this spiral pipe forming operation, the pipe diameter $D_p(=2\rho_p)$ is maintained by a plurality of internal holding rolls 52, which are each supported on a stand 51 so as to be movable back and forth in the direction of the axis of the pipe. The stand 51 is a combination of a roll support table and a moving table each having the same saw-tooth-shaped inclined surface as described before, and the apparatus further has bending moment imparting roll 55 supported on stand 54. The bending moment imparting rolls 55 are provided behind and on the outside of the exit-side external rolls 19 of the three roll bender. The bending moment imparting rolls 55 are moved by a mechanism that utilizes the action of a wedge the same as in the apparatus of the external holding type. The internal forming stand 14 and stand 51 are supported by an internal holding roll support table 57 that is positioned on the inside of the pipe 2 being manufactured.

Figure 9:
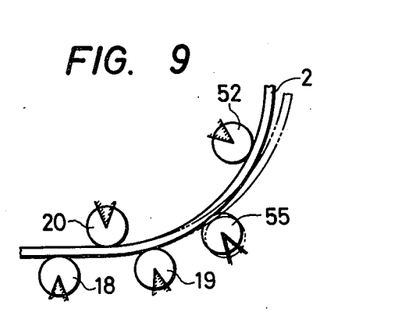
FIGS. 9 and 10 are schematic views illustrating how the bending operation is performed according to the internal holding method.
Figures 10, 11:
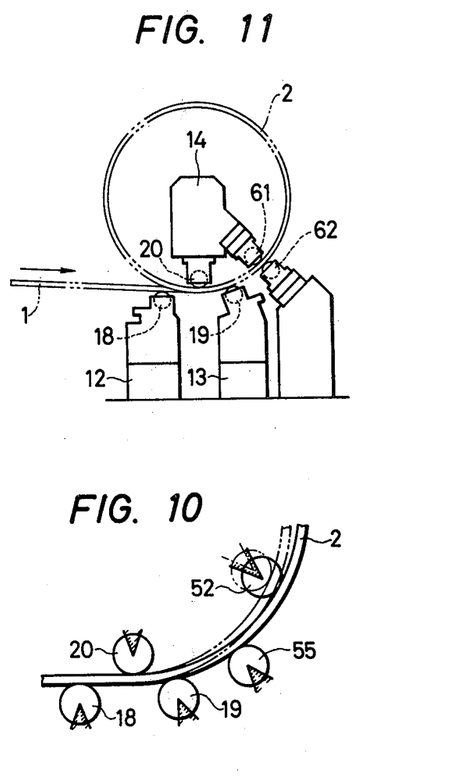
FIG. 11 is an end elevation of a forming apparatus according to an embodiment of this invention used with pipe manufacturing equipment having no holding rolls.

To impart positive residual moment, as shown in FIGS. 2 and 9, the strip is first pre-formed at point A as indicated by dotted lines, and then pressed inward, as indicated by the solid lines, by the bending moment imparting rolls 55, so as to be ready for welding. The pre-formed strip which will attain a curvature as at the point C in FIG. 2 at the time of complete springback, is pressed back to point B in FIG. 2, thereby establishing the desired finished pipe diameter, and the seam is welded with the pipe in this state. Consequently, the finished pipe has a positive residual moment $M_1$. For imparting negative residual moment, the strip pre-formed to a curvature indicated by the dotted lines in FIG. 10 is expanded from inside, using the internal holding rolls 52, to the desired finished pipe diameter as indicated by solid lines. In other words, the strip bent to a curvature at point A' in FIG. 2 is expanded back to point B' by use of the internal holding rolls 52, and is welded in that state. This results in a negative residual moment $M_2$. By thus changing the curvature of the strip in the range of curvatures between A and A', the residual moment can be varied within the range of B to B'.

FIG. 11 is an end view of an embodiment of a pipe manufacturing apparatus which does not use holding rolls according to this invention. As shown, two bending moment imparting rolls 61 and 62 are provided after the forming apparatus respectively lying on the inside and outside of the path of the pipe being manufactured, respectively. Residual moment is imparted by using either of or both the internal and external bending moment imparting rolls 61 and 62. Details of the operating method will not be described here since they are similar to those for the external and internal holding types of apparatus described previously.

According to this invention, the desired amount and direction of residual moment can be imparted to the product pipe at will. Furthermore, this can be accomplished on a single pipe manufacturing line, i.e. without using different lines. This means that spiral pipe having positive, zero and negative residual moment can be manufactured at will on the same equipment. If desired, in addition, it is also possible to manufacture a single piece of spiral pipe in which the residual moment changes continuously from positive to negative from one end thereof to the other.

Next, the basic concepts of controlling residual moment will be described.

(1) Setting the Initial Value of Residual Moment or the Ring-Opening Ratio.

When the Young's modulus and yield stress (E and $\sigma_y$) of the material of the strip, the pipe dimensions (2t and $\rho_p$) and the desired residual moment or the ring-opening ratio $\gamma$ are given, for example, the maximum curvature $1/\rho_i$ to be given to the strip by the forming apparatus is derived from equations (2) and (4) as follows:

$$\frac{1}{\rho_i} = \frac{1}{\rho_p}\left(\frac{\pi}{\pi + \gamma} + \frac{3}{2} \cdot \frac{\sigma_y \cdot \sigma_p}{E \cdot t}\right) \quad (8)$$

Usually, $\rho_i$ is difficult to measure directly. Therefore, the initial value of $\gamma$ can be established, for example, by first determining the relationship between the curvature of the strip directly under the internal forming rolls of the forming apparatus and the position of the rolls in the forming apparatus, and then determining the position of the rolls that corresponds to $\rho_i$ in equation (8). The following paragraphs discuss this point at length.

As a result of a theoretical analysis of the forming of strip by use of three forming rolls disposed at the apexes of a triangle, the inventors have found that the ring-opening ratio ($\gamma$) can be controlled by adjusting the relative position of the forming rolls. This finding will be described concretely by reference to FIG. 12 that shows the positional relationship between the forming rolls. As seen, there are three forming rolls; an entry-side roll 18, an internal roll 20, and an exit-side roll 19. These rolls all have the same diameter 2r. In this figure, $r_e$ designates the equivalent radius of each forming roll; and $r_e = r + t$ (where strip thickness = 2t). The figure is drawn as if the forming rolls were in contact with a line N extending along the center of the thickness of the strip. The entry- and exit-side forming rolls 18 and 19 are spaced from the internal forming roll 20 the same horizontal distance L. The vertical position of the entry- and exit-side forming rolls 18 and 19 is expressed by the distance $\delta_1$ and $\delta_2$ between a horizontal line H which is tangent to the periphery of the internal forming roll 20 at the lowermost point thereof, and the periphery of each roll 18 and 19 at the highest point thereof. If the mean screwdown (or screw-up) distance given to the forming rolls is expressed as $\delta_m = (\delta_1 + \delta_2)/2$, the value $\delta_m/L^2$ depends upon the Young's modulus E and yield stress $\sigma_y$ of the material of the strip, and the radius $\rho_p$, wall thickness 2t and ring-opening ratio $\gamma$.

Figure 13:
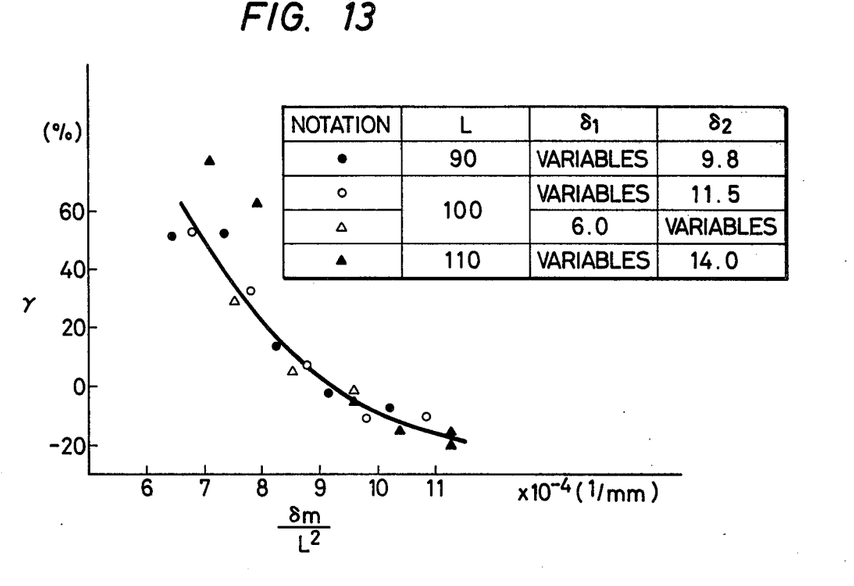
FIG. 13 is a graph showing the relationship between the position of the forming roll ($\delta_m/L^2$) and the residual moment ($\gamma$)

FIG. 13 shows graphically the relationship between $\gamma$ and $\delta_m/L^2$ that has been empirically proven. The experiment which proved the relationship was carried out under the conditions that the pipe radius $\rho_p = 400$ mm, strip thickness $2t = 9$ mm, the forming roll radius $r = 40$ mm, and the yield stress $\sigma_y = 30$ kg/mm$^2$. As seen, the residual moment changes from positive to negative as the value of $\delta_m/L^2$ increases.

Generally, the radius r of the forming rolls and the distance L therebetween are fixed in the forming apparatus, so the only value that can be varied, with respect to the positional relationship among the forming rolls, during the forming operation is the mean screwdown position $\delta_m$ described before. The mean screwdown distance $\delta_m$ can be adjusted by changing the distance $\delta_1$ of the entry-side forming roll 18 above line H by changing its screwdown position and the distance $\delta_2$ of the exit-side forming roll 19 above line H by changing its screwdown position. The inventors have also found that the residual moment can be exactly controlled if $\delta_2$ is fixed at a suitable value and $\delta_1$ alone is changed, as described in the following.

Figure 12:
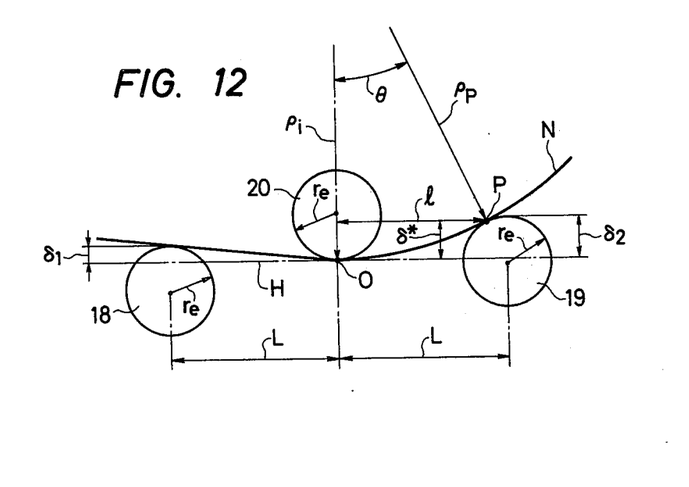
FIG. 12 is a schematic view illustrating the relative positional relationship of the forming rolls.

Ideally, the exit-side forming roll 19 should be held in contact with the periphery of the strip being bent to the final curvature $\rho_p$, as shown in FIG. 12. The figure is drawn as if the exit-side forming roll having the equivalent radius $r_e$ were contacting the center line N of the strip point P. Unless such a contact is achieved, or if, for example, the exit-side forming roll 19 is positioned higher (i.e. when $\delta_2$ is greater), that part of the strip in the vicinity of the point at which the forming roll 19 contacts it bends oppositely so that the external surface of the formed pipe becomes depressed. This results in a waste of forming energy and makes impossible the control of residual moment. If, conversely, the exit-side forming roll 19 is positioned lower (i.e. when $\delta_2$ is smaller), the strip is spaced from the forming roll 19, whereby the strip fails to be bent to the desired curvature.

By reference to FIG. 13, the appropriate position or optimum screwdown position to set distance $\delta_2$ of the exit-side forming roll 19 above line H is determined as follows: If the effective bending length at the center of strip thickness is l and the inclination angle of bending is $\theta$, l and $\theta$ can be expressed as follows from the geometric relationship:

$$l = \rho_p \sin \theta \quad (9)$$

$$L = l + r_e \sin \theta \quad (10)$$

From equations (9) AND (10), $$L = (\rho_p + r_e) \sin \theta \quad (11)$$

The effective screwdown position (or the roll height at contact point P)$\delta^*$ is expressed as $$\delta^* = \delta_2 - r_e(1 - \cos \theta) = \rho_p(1 - \cos \theta) \quad (12)$$

From this, $$\delta_2 = (\rho_p + r_e)(1 - \cos \theta) \quad (13)$$

From equations (11) and (13), $$\frac{L^2}{(\rho_p + r_e)^2} + \frac{(\rho_p + r_e - \delta_2)^2}{(\rho_p + r_e)^2} = 1 \quad (14)$$

From equation (14), $$\delta_2 = \rho_p + r_e - \sqrt{(\rho_p + r_e)^2 - L^2} \quad (15)$$

Thus, the screwdown position to be given to the exit-side forming roll 19 to position it at a distance $\delta_2$ above line H should be preset as given by equation (15).

As stated previously, there exists a certain relationship between $\delta_m/L^2$ and the ring-opening ratio $\gamma$ or the residual moment in the product pipe. It is therefore possible to control the residual moment by varying the mean screwdown distance $\delta_m = (\delta_1 + \delta_2)/2$ of the forming rolls. If the screwdown distance $\delta_2$ of the exit-side forming roll 19 is established by equation (15), the residual moment can be controlled by varying the screwdown distance $\delta_1$ of the entry-side forming roll 18 alone.

(2) Measures to Cope with Disturbances (or Changes in $\sigma_y$ nd 2t)

The following paragraphs describe how the residual moment $M_p$ should be controlled when a disturbance occurs due to a change in the yield stress $\sigma_y$ and thickness of the strip being formed.

Because of the elastic deformation of the screwdown mechanism, the housing, etc. of the forming apparatus, the apparatus screwdown distance $S_m$ and the real screwdown distance $\delta_m$ of the forming rolls do not agree with each other. The relationship between the two can be expressed as follows:

$$Q = K(S_m - \delta_m) \tag{16}$$

Where Q is the bending load, and K is the spring constant of the forming stand.

The inventors have empirically found that the bending force Q can be considered to be substantially the function of $\sigma_y$, 2t and $\delta_m$. Therefore, $$Q = \phi(\sigma_y, 2t, \delta_m) \tag{17}$$

Figure 14:
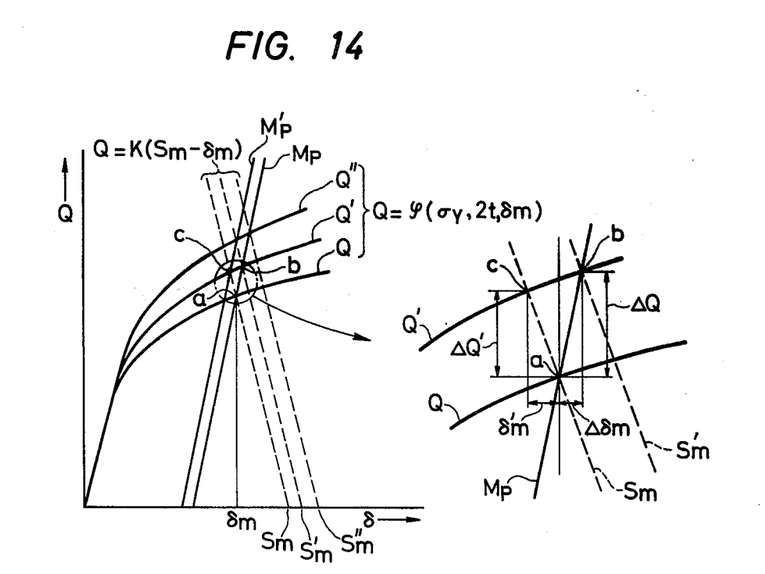
FIG. 14 is a diagram illustrating how the residual moment is adjusted by changing the position of the forming rolls.

FIG. 14, which will be described hereunder, is a graph that qualitatively shows the relationship $Q = \phi(\sigma_y, 2t, \delta_m)$.

Since $\delta \alpha 1/\rho$ approximately, $\delta_m$ is the function of $\rho_i$. Namely, $$\delta_m \approx \psi(\rho_i) \tag{18}$$

From equations (16) to (18), $$S_m = \frac{1}{K} \cdot \rho(\sigma_y, 2t, \delta_m) + \psi(\rho_i) \tag{19}$$

The way in which to adjust the residual moment will be described by assuming that $\sigma_y$ changes to $\sigma_y'$ during forming.

To keep the product pipe diameter $2\rho_p$ and residual moment $\gamma$ constant, $\rho_i$ must be changed to $\rho_i'$ as $\sigma_y$ changes to $\sigma_y'$ according to the relationship expressed by equation (8).

Namely, the screwdown distance of the forming rolls should be changed from $S_m$ to $S_m'$, according to equation (19), as follows:

$$S'_m = \frac{1}{K} \rho(\sigma'_y, 2t, \delta'_m) + \psi(\rho'_i)$$

FIG. 14 graphically illustrates the above-described calculation. A group of straight dashed lines $S_m$, $S_m'$ and $S_m''$, representing the elastic characteristic of the forming apparatus, express equation (16), using $S_m$ as a parameter. A group of curves Q, Q' and Q'', representing the forming load, express equation (17), using yield stress $\sigma_y$ as a parameter. Actually, the strip thickness 2t is also a variable in equation (17). But here 2t is considred to be constant. The straight line $M_p$ (or $\gamma$) indicates the desired residual moment. If the desired residual moment $M_p$ is given, the straight line AC, for example, in FIG. 2 can be approximately expressed by the straight line $M_p$ in FIG. 14, since $M_p \approx Q \cdot l$ and, approximately, $\delta \alpha 1/\rho$.

In FIG. 14, point a indicates that a pipe having a residual moment $M_p$ can be obtained by forming a strip that has a yield stress $\sigma_y$ with a screwdown distance $S_m$. If the yield stress changes to $\sigma_y'$, the forming load changes, according to equation (17), to produce a load curve Q'. To obtain the desired residual moment, forming should be effected with a load at point b where the straight line $M_p$ and the curve Q' intersect. At this time, the apparent screwdown distance is expressed as $S_m'$ by the straight line that passes through the intersection point b.

When the strip thickness 2t changes, the desired residual moment can be imparted to the finished pipe in the same manner as described above.

The following paragraphs describe a method of automatically controlling the amount of strip bending in order to impart the desired residual moment to the finished pipe when the yield stress $\sigma_y$ and/or thickness 2t of the material strip changes.

Figure 15:
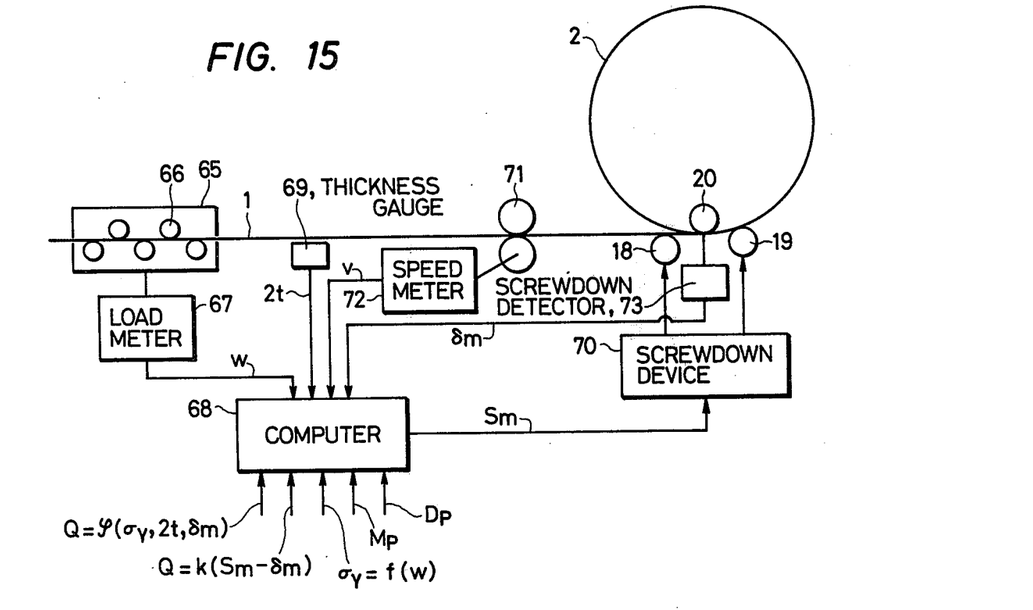
FIG. 15 is a schematic illustration of a forming apparatus which includes a system that automatically controls the amount of bending by detecting a change in the yield stress of the strip being formed.

FIG. 15 shows schematically a forming apparatus incorporating a control device. Before being bent, a strip 1 is flattened by a roller leveler 65. In the roller leveler, there exists a functional relationship between the load W on the rollers 66 of the roller leveler 65 and the yield stress $\sigma_y$ of the strip 1. Therefore, if this function, $\sigma_y = f(W)$, is empirically determined, the yield stress $\sigma_y$ can be determined by measuring the load W. The load W is continuously measured on-line by means of a load meter 67 utilizing a load cell or the like. The measured load W is inputted in a control computer 68 where the yield stress $\sigma_y$ is determined from the function f(W). A thickness gauge 69 is provided along the path of movement of the strip for measuring the thickness 2t of the strip, and the measured thickness is inputted to the control computer 68.

The control computer 68 is programmed to compute according to two functions $Q = \phi(\sigma_y, 2t, \delta_m)$ and $Q = K(S_m - \delta_m)$ as shown in FIG. 14. The computer 68 calculates the screwdown distance $S_m$ for the forming apparatus form these functions in accordance with the changes in the yield stress $\sigma_y$ and/or thickness 2t of the material strip, following the same procedure as described previously.

Figure 16:
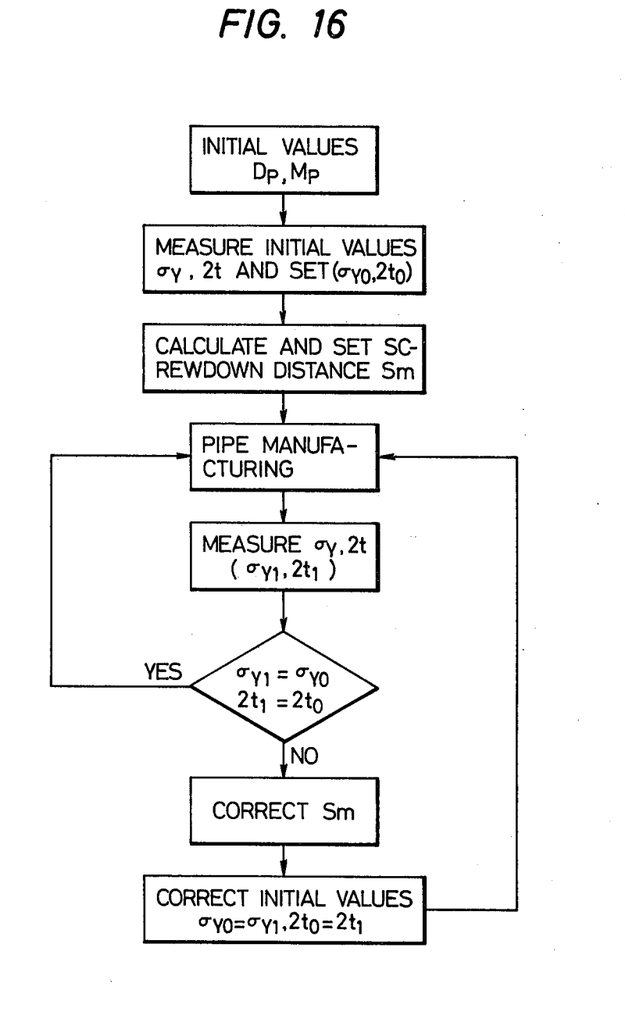
FIG. 16 is a flow chart showing the arithmetic operation performed by the control computer shown in FIG. 15.

FIG. 16 is a flow chart showing the arithmetic operation performed by the control computer 68. The desired pipe diameter $D_p$ and residual moment $M_p$ are preset in the computer 68. Then, the yield stress $\sigma_y$ and thickness 2t of material strip are measured, and supplied as initial values $\sigma_{yo}$ and $2t_o$ in the computer 68. Based on these initial values, the screwdown distance $S_m$ is determined by the calculation shown in FIG. 14 and, then, set in the computer 68.

When the above setting has been completed, the manufacturing of pipe is started and the values of $\sigma_y$, and 2t are measured. If the measured values $\sigma_{y1}$ and $2t_1$ are equal to the initial values $\sigma_{yo}$ and $2t_o$ respectively, the pipe ma turing is continued with the initially calculated screwdown distance $S_m$. If the measured and initial values are not equal, the screwdown distance $S_m$ is corrected and, at the time, $\sigma_{y1}$ and $2t_1$ are set in the computer 68 as new initial values.

The thus determined screwdown distance $S_m$ is inputted to a screwdown device 70. The time lag due to the distance between the forming apparatus and the roller leveler 65 is corrected by using the travel speed v of the strip 1 that is detected by a speed meter 72 coupled to a pinch roller 71. That is, when the part of the strip 1 where the load W of the roller leveler 65 is measured reaches the forming apparatus, the screwdown distance $S_m$ required for that part is set in the forming apparatus.

The real screwdown $\delta_m$ of the forming apparatus is detected by a screwdown detector 73 that detects the position of the roll or roll shaft. The screwdown $\delta_m$ thus detected is fed back to the computer 68.

Figure 17:
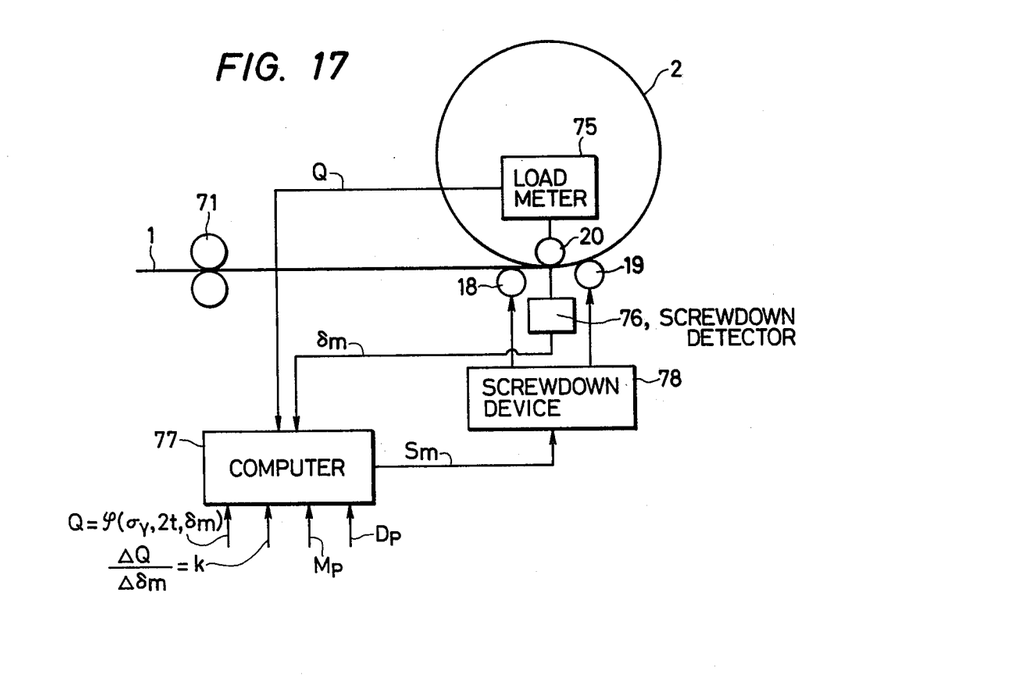
FIG. 17 is a schematic illustration of a forming apparatus which includes a system that automatically controls the amount of bending by detecting the ratio between the changes in the amount of bending and the forming load.

FIG. 17 is a schematic view of a forming apparatus incorporating a control device operating on another principle.

This device detects the load Q and real screwdown $\delta_m$ of the forming roll 20 using a load meter 75 and a screwdown detector 76, respectively. The detected values Q and $\delta_m$ are inputted to a control computer 77. The control computer 77 is programmed for the function $Q=\phi(\sigma_y, 2t, \delta_m)$, the aimed-for value $\Delta Q/\Delta \delta_m = k$, and $M_p$ shown in FIG. 14. As mentioned previously, the line $M_p$ in FIG. 14 is straight line. Therefore, the real screwdown distance $\delta_m$ is controlled by controlling the apparent screwdown distance $S_m$ so that $\Delta Q/\Delta \delta_m$ is at all times a constant value k.

Let it be assumed, for example, that the yield stress of the strip changes from $\sigma_y$ to $\sigma_y'$ when forming is being carried out at point a on the forming load curve Q in FIG. 14. Because of this change, the forming load curve changes from Q to Q'. Therefore, if the forming operation is continued while maintaining the screwdown position of the forming rolls at the same distance $S_m$, the forming condition changes from point a to point c. At this time, the ratio of the change in the forming load Q to the change in the real screwdown $\delta_m$ becomes $\Delta Q'/\Delta \delta_m'$ which is wide of the aimed-for value. As a consequence, the moment in the finished pipe becomes $M_p'$, instead of the desired $M_p$. Therefore the computer 77 issues a command to change the screwdown distance from $S_m$ to $S_m'$, whereupon point c, which indicates the forming condition, moves along the curve Q' until point b is reached. At this time, the ratio $Q/\Delta \delta_m$ becomes equal to the aimed-for value k, so that the desired residual moment $M_p$ is imparted to the product pipe.

Figure 18:
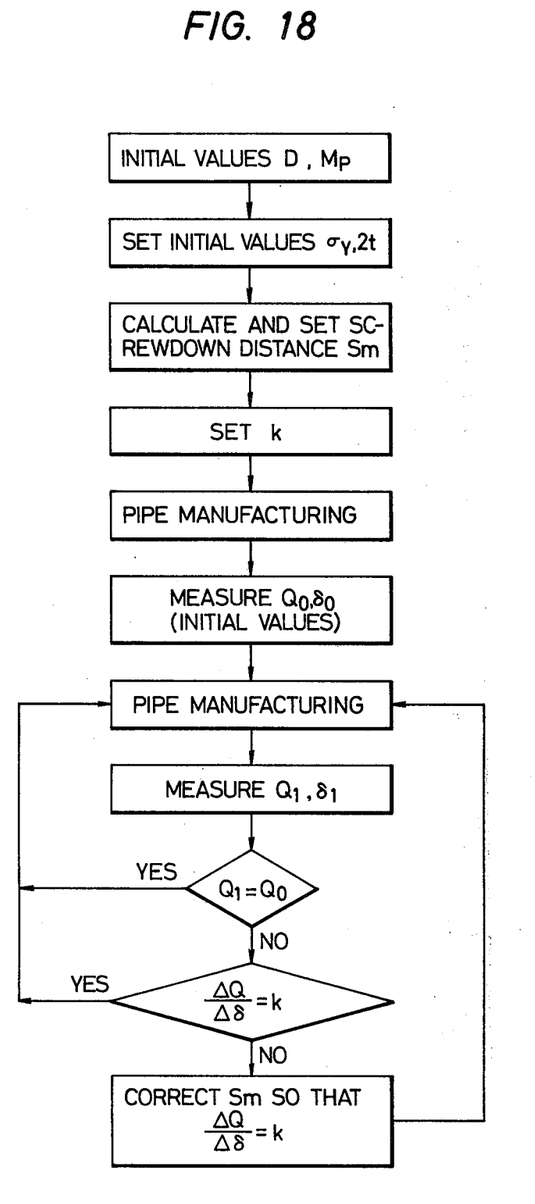
FIG. 18 is a flow chart showing the arithmetic operation performed by the control computer shown in FIG. 17.

FIG. 18 is a flow chart showing the arithmetic operation of the control computer 77. The desired pipe diameter $D_p$ and residual moment $M_p$ are preset in the computer 77. Also, the preliminary measured yield stress $\sigma_y$ and thickness 2t of the strip are supplied as initial values. Based on these inputs, the screwdown distance $S_m$ is determined by the calculation shown in FIG. 14, and the obtained value is set in the computer 77.

When the above setting has been completed, the manufacturing of pipe is started, and the forming load and screwdown distance are measured, as initial values $Q_0$ and $\delta_0$. While continuing the manufacturing operation, the forming load $Q_1$ and screwdown position $\delta_1$ are measured. If $Q_1$ equals $Q_0$, the operation is continued. If $Q_1$ is not equal to $Q_0$, the ratio $\Delta Q/\Delta \delta$ is determined. If, then, $\Delta Q/\Delta \delta$ equals k, the operation is continu ed. If $\Delta Q/\Delta \delta$ is not equal to k, the screwdown distance $S_m$ is adjusted by screwdown device 78 so that $\Delta Q/\Delta \delta$ becomes equal to k.

This invention is by no means limited to the embodiments described above. For example, the forming rolls in the foregoing embodiments are of the split type; in other words, a plurality of rolls are used for performing the forming function. But a single forming roll can serve the same purpose. Also, the table having the saw-tooth-shaped inclined surface, which is used for adjusting the position of the forming roll, can be replaced with a threaded or hydraulic screwdown device.

What is claimed is:

1. In a method of manufacturing spiral pipe using a forming apparatus having three forming roll means at the apexes of a triangle and positioned along the circumference of the pipe being manufactured and in which method a first strip of pipe material is fed in the longitudinal direction thereof through said three roll means and is continuously bent into spiral form by pressing one of the forming roll means which is inside the circumference against the inner surface of the strip toward the outside of the pipe and pressing the other two forming roll means which are respectively ahead of and behind said inside forming roll means in the direction of movement of the strip against the outer surface of the strip toward the inside of the pipe, and the seam of a spirally formed strip is continuously welded, the improvement which comprises the steps of:

determining, based on the thickness of the strip and the yield stress of the material of the strip and the curvature of the finished pipe, a maximum curvature $1/\rho_i$ of the strip before spring back expressed as $$\frac{1}{\rho_i} = \frac{\frac{\pi}{\pi+\gamma} + \frac{3}{2} \cdot \frac{\sigma_y \cdot \rho_p}{E \cdot t}}{\rho_p}$$

where
$\sigma_y$ = yield stress of the material strip
E = Young's modulus of the material of the strip
2t = thickness of the material strip
$\rho_p$ = radius of the finished pipe and $\gamma$ is derived from $$M_p = \frac{2Et^3}{3\rho_p}\left(\frac{\gamma}{\pi+\gamma}\right)$$

where $M_p$ is the desired residual moment, and which maximum curvature has a smaller radius of curvature than the radius of curvature of the finished pipe and which is sufficiently great, when it is desired that the finished pipe have a positive residual moment, to cause the pipe, when the force causing such bending is released, to spring back to an unstressed bent form with a radius of curvature which is larger than the radius of curvature of the finished pipe, and when it is desired that the finished pipe have a zero residual moment, to cause the pipe, when the force causing such bending is released, to spring back to an unstressed bent form with a curvature which is equal to the curvature of the finished pipe, and when it is desired that the finished pipe have a negative residual moment, to cause the pipe, when the force causing such bending is released, to spring back to an unstressed bent form with a radius of curvature which is smaller than the radius of curvature of the finished pipe;

continuously forming the flat strap into a spiral having said maximum curvature by adjusting the positions of said forming roll means in a direction transverse to the thickness of the strip; and, prior to the welding step, when it is desired to impart a positive residual moment to the finished pipe, exerting a force on the exterior of the strip subsequent to the forming roll means in a direction of movement of the strip for restraining the springback of the strip to a curvature corresponding to the curvature of the finished pipe, and when it is desired to impart a negative residual moment to the finished pipe, allowing the pipe to spring back to the unstressed bent form and then exerting a force on the strip from the interior of the strip subsequent to the forming roll means in the direction of movement of the strip for expanding the strip to a curvature corresponding to the curvature of the finished pipe.

2. In a method of manufacturing spiral pipe using a forming apparatus having three forming roll means at the apexes of a triangle and positioned along the circumference of the pipe being manufactured and in which method a flat strip of pipe material is fed in the longitudinal direction thereof through said three roll means and is continuously bent into spiral form by pressing one of the forming roll means which is inside the circumference against the inner surface of the strip toward the outside of the pipe and pressing the other two forming roll means which are respectively ahead of and behind said inside forming roll means in the direction of movement of the strip against the outer surface of the strip toward the inside of the pipe, and the seam of the spirally formed strip is continuously welded, the improvement which comprises the steps of:

measuring the thickness of the strip, and measuring the yield stress by providing a roller leveler ahead of the forming roll means, measuring the leveling load applied by said roller leveler, and converting the measured load into yield stress;

determining, based on the thickness of the strip and the yield stress of the material of the strip and the curvature of the finished pipe, a maximum curvature $1/\rho_i$ of the strip before spring back expressed as $$\frac{1}{\rho_i} = \frac{\frac{\pi}{\pi+\gamma} + \frac{3}{2} \cdot \frac{\sigma_y \cdot \rho_p}{E \cdot t}}{\rho_p}$$

where
$\sigma_y$ = yield stress of the material strip
$E$ = Young's modulus of the material of the strip
$2t$ = thickness of the material strip
$\rho_p$ = radius of the finished pipe and $\gamma$ is derived from $$M_p = \frac{2Et^3}{3\rho_p}\left(\frac{\gamma}{\pi+\gamma}\right)$$

where $M_p$ is the desired residual moment, and which maximum curvature has a smaller radius of curvature than the radius of curvature of the finished pipe and which is sufficiently great, when it is desired that the finished pipe have a positive residual moment, to cause the pipe, when the force causing such bending is released, to spring back to an unstressed bent form with a radius of curvature which is larger than the radius of curvature of the finished pipe, and when it is desired that the finished pipe have a zero residual moment, to cause the pipe, when the force causing such bending is released, to spring back to an unstressed bent form with a curvature which is equal to the curvature of the finished pipe, and when it is desired that the finished pipe have a negative residual moment, to cause the pipe, when the force causing such bending is released, to spring back to an unstressed bent form with a radius of curvature which is smaller than the radius of curvature of the finished pipe; continuously forming the flat strip into a spiral having said maximum curvature by adjusting the positions of said forming roll means in a direction transverse to the thickness of the strip; and, prior to the welding step, when it is desired to impart a positive residual moment to the finished pipe, exerting a force on the exterior of the strip subsequent to the forming roll means in a direction of movement of the strip for restraining the springback of the strip to a curvature corresponding to the curvature of the finished pipe, and when it is desired to impart a negative residual moment to the finished pipe, allowing the pipe to spring back to the unstressed bent form and then exerting a force on the strip from the interior of the strip subsequent to the forming roll means in the direction of movement of the strip for expanding the strip to a curvature corresponding to the curvature of the finished pipe.

3. The improvement as claimed in claim 1, in which said adjusting of the position of the forming roll means comprises moving only the forming roll means that is positioned ahead of, in the direction of movement of the strip, the internal forming roll means while keeping the internal forming roll means and the forming roll means that is positioned behind the internal forming roll means in predetermined positions.

4. The improvement as claimed in claim 1, in which the yield stress and the thickness of the strip being formed is measured, and the position of the forming rolls is adjusted based on the values thus determined.

5. The improvement as claimed in claim 1, in which one of the characteristics of the strip being formed taken from the characteristics of yield stress and thickness is measured.

6. The improvement as claimed in claim 1, further comprising measuring the bending load applied to the strip by the forming roll means and the position of the forming roll means relative to the path of movement of the strip during the forming step, and adjusting the position of the forming roll means for making the ratio of a change in the position of the forming roll means to a change in the bending load such that the desired residual moment is obtained.

7. A spiral pipe manufacturing apparatus which comprises: a forming apparatus having three forming roll means disposed at the apexes of a triangle and positioned along the circumference of the pipe being manufactured for continuously bending a flat strip into spiral form, one of said roll means being an internal forming roll for contacting the inner surface of the strip and pressing toward the outside of the pipe and the other two of said forming roll means being outer rolls and respectively being ahead of and behind said internal forming roll in the direction of movement of the strip and for contacting the outer surface of the strip and pressing it toward the inside of the pipe, a welding apparatus provided behind said forming apparatus in the direction of movement of the strip and along the circumference of the pipe being manufactured for continuously welding the seam of the spirally formed strip, a plurality of holding rolls positioned along the path of movement of the strip behind said forming apparatus for engaging one side of the strip for holding the strip in a shape equal to the desired diameter of the pipe, and a bending moment imparting roll means adjacent to and behind the forming apparatus in the direction of movement of the strip and ahead of the first of said holding rolls and on the opposite side of the strip from said holding rolls and adjustably movable in the direction of the pipe diameter for engaging the strip for holding it in a position as it moves past said bending moment imparting roll means for making the diameter of the spirally bent strip equal to the desired diameter of the finished pipe.

8. An apparatus as claimed in claim 7, in which said other two forming roll means are adjustably movable toward said one of said forming roll means, and further comprising means for sensing the characteristics of the strip being bent and adjusting the position of at least one of the other two forming roll means in response to the sensed characteristics for applying the desired bending force to the strip.

9. An apparatus as claimed in claim 8, in which said sensing and adjusting means comprises means for adjusting the position of only one of said other two forming roll means.

10. An apparatus as claimed in claim 7, in which said plurality of holding rolls are on the inside of the strip, and said bending moment imparting roll means comprises an outer bending moment imparting roll means mounted on said apparatus for movement toward and away from the path of movement of the strip and on the outside of the circumference of the pipe being manufactured.

11. An apparatus as claimed in claim 8, in which said plurality of holding rolls are on the outside of said strip, and said bending moment imparting roll means comprises an inner bending moment imparting roll means mounted on said apparatus for movement toward and away from the path of movement of the strip and on the inside of the circumference of the pipe being manufactured.

* * * * *